(12) United States Patent
Kamitani et al.

(10) Patent No.: US 7,727,657 B2
(45) Date of Patent: Jun. 1, 2010

(54) FUEL RESERVOIR FOR FUEL CELL

(75) Inventors: Toshimi Kamitani, Fujioka (JP);
Yasunari Kabasawa, Hamura (JP)

(73) Assignees: Mitsubishi Pencil Co., Ltd., Shinagawa-Ku, Tokyo (JP); Casio Computer Co., Ltd., Shibuya-Ku, Tokyo (JP)

( * ) Notice: Subject to any disclaimer, the term of this patent is extended or adjusted under 35 U.S.C. 154(b) by 99 days.

(21) Appl. No.: 11/629,874

(22) PCT Filed: Jun. 27, 2005

(86) PCT No.: PCT/JP2005/011732
§ 371 (c)(1),
(2), (4) Date: Mar. 12, 2008

(87) PCT Pub. No.: WO2006/001418
PCT Pub. Date: Jan. 5, 2006

(65) Prior Publication Data
US 2008/0292915 A1    Nov. 27, 2008

(30) Foreign Application Priority Data
Jun. 25, 2004    (JP) .......................... 2004-188178

(51) Int. Cl.
*H01M 8/00* (2006.01)
(52) U.S. Cl. .......................... 429/34; 429/38
(58) Field of Classification Search .......... 429/12, 429/22, 36, 34, 38, 18, 23, 25; 422/211; 220/260, 284, 4.12
See application file for complete search history.

(56) References Cited

U.S. PATENT DOCUMENTS 5,364,711 A    11/1994   Yamada et al.

(Continued)

FOREIGN PATENT DOCUMENTS

EP    1 087 455 A    3/2001

(Continued)

OTHER PUBLICATIONS

Supplementary European Search Report issued in corresponding Application No. 05765062.4 dated Apr. 9, 2009.

*Primary Examiner*—Patrick Ryan
*Assistant Examiner*—Monique Wills
(74) *Attorney, Agent, or Firm*—Buchanan Ingersoll & Rooney PC

(57) ABSTRACT

A fuel reservoir for a fuel cell detachably connected with a fuel cell main body is constituted from a fuel storing vessel of a tube type for storing a liquid fuel, a fuel discharge part and a follower which seals the liquid fuel and moves as the liquid fuel is consumed at the rear end of the liquid fuel. The inside of the fuel storing vessel includes a fuel storing chamber at least hermetically sealed with the follower and a pressurizing chamber filled with a means for pressing the follower staying in a state in which it is completely separated from the ambient air and hermetically sealed. The fuel reservoir for a fuel cell makes it possible to prevent boiling, bubbling and spouting of the liquid fuel and to stably supply the liquid fuel directly to a fuel cell main body.

6 Claims, 8 Drawing Sheets

U.S. PATENT DOCUMENTS

| | | | |
|---|---|---|---|
| 5,432,023 A | 7/1995 | Yamada et al. | |
| 6,506,513 B1 | 1/2003 | Yonetsu et al. | |
| 6,777,118 B2 | 8/2004 | Shioya | |
| 6,824,905 B2 | 11/2004 | Shioya et al. | |
| 6,916,565 B2 | 7/2005 | Shioya | |
| 7,169,367 B2 | 1/2007 | Takeyama et al. | |
| 2003/0082421 A1 | 5/2003 | Yonetsu et al. | |
| 2004/0013928 A1 | 1/2004 | Yamauchi et al. | |
| 2004/0126646 A1 | 7/2004 | Suda et al. | |
| 2005/0233189 A1 | 10/2005 | Shioya | |
| 2006/0151494 A1 | 7/2006 | Nakamura et al. | |
| 2006/0172171 A1* | 8/2006 | Deinzer et al. | 429/34 |
| 2008/0070071 A1* | 3/2008 | Devos | 429/19 |

FOREIGN PATENT DOCUMENTS

| | | |
|---|---|---|
| JP | 59-066066 A | 4/1984 |
| JP | 05-258760 A | 10/1993 |
| JP | 05-307970 A | 11/1993 |
| JP | 6-188008 | 7/1994 |
| JP | 2001-93551 A | 4/2001 |
| JP | 2001-102069 A | 4/2001 |
| JP | 2003-229158 A | 8/2003 |
| JP | 2003-299946 A | 10/2003 |
| JP | 2003/317755 A | 11/2003 |
| JP | 2003-340273 A | 12/2003 |
| JP | 2004-63200 A | 2/2004 |
| JP | 2004-247136 A | 9/2004 |
| JP | 2005-032598 A | 2/2005 |
| JP | 2005-32598 A | 2/2005 |
| JP | 2005-38803 A | 2/2005 |
| JP | 2005-228663 A | 8/2005 |

* cited by examiner

11a 11b
11c
X
Y 11d
11c 11e
11g
11f (f)

(g)
11h
11a
11e
11f (h)

10
11a
11
11e

FUEL RESERVOIR FOR FUEL CELL

TECHNICAL FIELD

The present invention relates to a fuel reservoir for a fuel cell, more specifically to a fuel reservoir suited to a small-sized fuel cell used as an electric power source for portable electronic appliances such as cellular phones, note type personal computers and PDA.

BACKGROUND ART

In general, a fuel cell comprises a cell on which an air electrode layer, an electrolyte layer and a fuel electrode layer are laminated, a fuel supplying part for supplying a fuel as a reducing agent to the fuel electrode layer and an air supplying part for supplying air as an oxidizing agent to the air electrode layer, and it is an electric cell in which electrochemical reaction take place in the cell between the fuel and oxygen in the air to provide electric power to the outside. Fuel cells of various types are developed.

In recent years, because of a rise in consciousness to environmental problems and energy saving, it is studied to use a fuel cell as a clean energy source for various applications. In particular, attentions have been paid to fuel cells which can generate electric power by only supplying directly a liquid fuel comprising methanol and water (refer to, for example, patent documents 1 and 2).

Among them, liquid fuel type fuel cells making use of capillary force for supplying a liquid fuel are known (refer to, for example, patent documents 3 to 7).

Liquid fuel type fuel cells described in the above respective patent documents supply a liquid fuel from a fuel tank to a fuel electrode by virtue of capillary force, and therefore they do not require a pump for sending a liquid fuel with pressure, so that they have merits in reducing a size.

Such liquid fuel type fuel cells as merely making use of capillary force of a porous body and/or a fiber bundle disposed in a fuel reservoir are suited to reduction in a size in terms of constitution, but because a fuel is supplied directly to a fuel electrode in the form of liquid, the fuel follows imperfectly during use over a long period of time under use environment in which it is mounted in a small-sized portable equipment and in which the direction of a cell part are changed constantly in every direction, and the trouble that the fuel is cut off from being supplied is brought about, so that the fuel is interrupted from being supplied constantly to a fuel electrode layer.

On the other hand, known as one of countermeasures for solving the defects is, for example, a fuel cell system in which a liquid fuel is introduced into a cell by virtue of capillary force and in which the liquid fuel is then vaporized in a fuel vaporizing layer and used (refer to, for example, a patent document 8). However, it has the problem that poor followability of the fuel which is a fundamental problem is not improved, and involved therein is the problem that it is difficult to reduce a size of the fuel cell having the above structure because of a system in which a liquid is vaporized and then used as fuel.

As described above, in conventional fuel reservoirs for a fuel cell, the existing situation is that a liquid fuel is instably supplied in supplying the fuel directly to a fuel electrode to cause fluctuation in an output value during operation and that it is difficult to reduce a size thereof to such an extent that they can be mounted in portable appliances while maintaining stable characteristics.

Then, the present applicants filed a patent application of a direct methanol fuel cell in which jointed are plural unit cells each of which is formed by constructing an electrolyte layer on the outer surface of a fuel electrode body comprising a fine porous carbonaceous body and constructing an air electrode layer on the outer surface of the electrolyte layer, wherein a fuel supplying member which is connected with a fuel reservoir for storing a liquid fuel comprising a cartridge structure and which has a penetrating structure is connected with the respective unit cells to supply the liquid fuel (refer to, for example, a patent document 9).

This fuel cell has an excellent function which has never been observed, but involved therein is the problem that when a cartridge type fuel reservoir is heated to be in a high temperature state, boiling, bubbling and spouting of a liquid fuel are brought about a little.

Patent document 1: Japanese Patent Application Laid-Open No. 258760/1993 (claims, examples and others)

Patent document 2: Japanese Patent Application Laid-Open No. 307970/1993 (claims, examples and others)

Patent document 3: Japanese Patent Application Laid-Open No. 66066/1984 (claims, examples and others)

Patent document 4: Japanese Patent Application Laid-Open No. 188008/1994 (claims, examples and others)

Patent document 5: Japanese Patent Application Laid-Open No. 229158/2003 (claims, examples and others)

Patent document 6: Japanese Patent Application Laid-Open No. 299946/2003 (claims, examples and others)

Patent document 7: Japanese Patent Application Laid-Open No. 340273/2003 (claims, examples and others)

Patent document 8: Japanese Patent Application Laid-Open No. 102069/2001 (claims, examples and others)

Patent document 9: Japanese Patent Application Laid-Open No. 63200/2004 (claims, examples and others)

DISCLOSURE OF THE INVENTION

Problems to be Solved by the Invention

In light of the problems and the existing situation in the conventional fuel reservoirs for a fuel cell described above, the present invention has been made in order to solve them, and an object thereof is to provide a fuel reservoir for a fuel cell in which boiling, bubbling and spouting of a liquid fuel can be prevented even when the fuel reservoir is heated to be in a high temperature state, which allows the liquid fuel to be stably supplied directly to a fuel cell main body and enables the fuel cell to be reduced in a size, and in which a loss in the liquid fuel is not observed even in storing at high temperature.

Means for Solving the Problems

Intensive studied on the conventional problems described above repeated by the present inventors have resulted in finding that a fuel reservoir for a fuel cell which meets the object described above is obtained by a fuel reservoir detachably connected with a fuel cell main body, wherein the fuel reservoir is equipped with a fuel storing vessel for storing a liquid fuel, a fuel discharge part and a follower having specific physical properties at the rear end of the liquid fuel, and the fuel storing vessel is provided with a specific structure, and thus the present invention has come to be completed.

That is, the present invention comprises the following items (1) to (7).

(1) A fuel reservoir for a fuel cell detachably connected with a fuel cell main body, wherein the fuel reservoir is constituted from a fuel storing vessel for storing a liquid fuel, a fuel discharge part and a follower which seals the liquid fuel and moves as the liquid fuel is consumed at the rear end of the liquid fuel, and the inside of the fuel storing vessel comprises a fuel storing chamber at least hermetically sealed with the follower and a pressurizing chamber filled with a means for pressing the follower staying in a state in which it is completely separated from the ambient air and hermetically sealed.

(2) The fuel reservoir for a fuel cell as described in the above item (1), wherein the means for pressing the follower filled in the pressurizing chamber comprises a volatile liquid comprising a composition having a higher vapor pressure than that of the liquid fuel filled in the fuel storing chamber.

(3) The fuel reservoir for a fuel cell as described in the above item (2), wherein the volatile liquid is filled in the pressurizing chamber in an amount which can keep a saturated vapor pressure in at least a volume obtained by totaling a volume of the pressurizing chamber and a volume of the fuel storing chamber.

(4) The fuel reservoir for a fuel cell as described in any one of the above items (1) to (3), wherein the pressurizing chamber is equipped with at least one seal valve through which air can be introduced.

(5) The fuel reservoir for a fuel cell as described in the above item (4), wherein the seal valve comprises a valve from which vapor does not leak even at a vapor pressure of the volatile liquid at 100° C.

(6) The fuel reservoir for a fuel cell as described in any one of the above items (1) to (5), wherein the liquid fuel is at least one selected from the group consisting of methanol solution, an ethanol solution, dimethyl ether (DME), formic acid, hydrazine, an ammonia solution, ethylene glycol, a saccharide aqueous solution and sodium boron hydride.

(7) The fuel reservoir for a fuel cell as described in any one of the above items (1) to (6), wherein the fuel cell main body assumes a structure in which it is connected with plural unit cells each of which is formed by constructing an electrolyte layer on the outer surface of a fuel electrode body and constructing an air electrode layer on the outer surface of the electrolyte layer and in which a fuel supplying member connected with the fuel reservoir is connected with the unit cells to supply the liquid fuel.

EFFECTS OF THE INVENTION

According to the present invention, provided is a fuel reservoir for a fuel cell in which boiling, bubbling and spouting of a liquid fuel can be prevented even when the fuel reservoir is heated to be in a high temperature state, in which the liquid fuel is stably supplied directly to a fuel cell main body, in which a loss in the liquid fuel is not observed even in storing at high temperature and which can reduce a size of the fuel cell.

According to the invention of the items (2) to (7), obtained is a fuel reservoir for a fuel cell in which boiling, bubbling and spouting of the liquid fuel can further be prevented even when the fuel reservoir is heated to be in a high temperature state, in which the liquid fuel is further stably supplied directly to a fuel cell main body and in which a loss in the liquid fuel is very small even in storing at high temperature.

LIST OF REFERENCE NUMERALS AND LETTERS

A: Fuel reservoir for a fuel cell
F: Liquid fuel
G: Volatile fuel
10 Fuel storing vessel
11 Fuel discharge part
11*a* Valve
12 Follower
13 Fuel storing chamber
14 Pressurizing chamber

BEST MODE FOR CARRYING OUT THE INVENTION

The embodiments of the present invention shall be explained below in details with reference to the drawings.

Figure 1A:
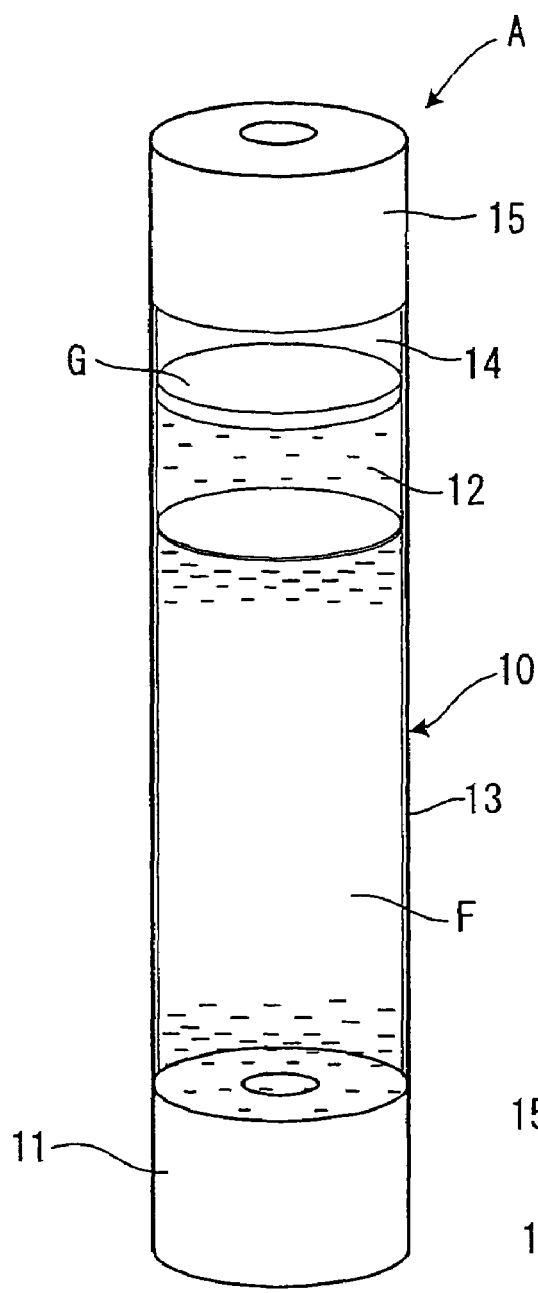
FIG. 1 (a) is an outline perspective drawing showing a fuel reservoir for a fuel cell of the first embodiment according to the present invention, and (b) is a partial cross-sectional drawing showing an essential part of a pressurizing chamber.
Figure 1B:
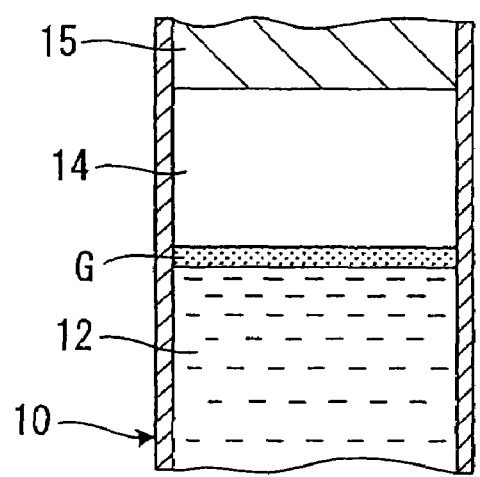

FIG. 1 to FIG. 2 show a fundamental aspect (first embodiment) of a fuel reservoir for a fuel cell A showing the fundamental embodiment of the present invention.

The fuel reservoir for a fuel cell A of the present first embodiment is a fuel reservoir detachably connected with a fuel cell main body, wherein it is equipped with a fuel storing vessel 10 of a tube type for storing a liquid fuel F, a fuel discharge part 11 and a follower 17 which seals the liquid fuel F and moves as the liquid fuel F is consumed at the rear end of the liquid fuel F; and the inside of the fuel storing vessel 10 comprises a fuel storing chamber 13 at least hermetically sealed with the follower 12 and a pressurizing chamber 14 filled with a means for pressing the follower 12 staying in a state in which it is completely separated from the ambient air and hermetically sealed.

The fuel storing vessel 10 of a tube type described above is preferably constituted from a material having storage stability and durability against a liquid fuel stored therein, a gas non-permeating property (gas non-permeating property against oxygen gas, nitrogen gas and the like) and light transmittance so that a remaining amount of the liquid fuel can visually be observed.

The material of the fuel storing vessel 10 includes, for example, metals such as aluminum and stainless steel, synthetic resins and glass when light transmittance is not required, and from the viewpoints of visibility of the remaining amount of the liquid fuel described above, a gas non-permeating property, reduction in a cost in producing and assembling and easiness of production, the fuel storing vessel is preferably constituted from a single layer structure or a multilayer structure of two or more layers comprising a single kind or two or more kinds of resins such as polypropylene, polyvinyl alcohol, ethylene-vinyl alcohol copolymer resins, polyacrylonitrile, nylon, cellophane, polyethylene terephthalate, polycarbonate, polystyrene, polyvinylidene chloride and polyvinyl chloride each having the respective characteristics described above. In the case of the multilayer structure, as long as at least one layer is constituted from a resin having the performances described above (the gas non-permeating property and the like), problems in terms of actual use are not involved therein even if the remaining layers are constituted from ordinary resins. Such tubes having a multilayer structure can be produced by extrusion molding, injection molding and co-extrusion molding.

The fuel discharge part 11 is, as shown in FIG. 2 (*a*) to (*h*), equipped with a valve 11*a* which is a fuel discharge valve for sealing communication between the inside and the outside of the cylindrical fuel storing vessel 10, and a structure in which the valve 11*a* is installed in the fuel discharge part 11 directly or via a valve adaptor is assumed in the present embodiment. This valve 11*a* assumes the same structure as that of a member used in writing instruments, and the liquid fuel F stored directly in the fuel storing vessel 10 is protected, as shown in FIG. 2 (*a*) to (*c*), from foreign matters such as air coming in from the periphery of a fuel supplying tube described later due to a change in barometric pressure and temperature.

The above valve 11*a* allows the fuel storing vessel 12 to be communicated between the inside and the outside by inserting a liquid fuel supplying member, and is provided with a communicating part 11*b* comprising a linear slit for supplying the liquid fuel F in the inside of the fuel storing vessel 10 to the outside. In addition thereto, when the valve 11*a* is installed in the fuel discharge part 11 or the valve adaptor, the valve 11*a* is compressed to an axis direction by a valve outer peripheral part 11*c*, whereby compressing force works on the communicating part 11*c* described above. In the present embodiment, the valve is elliptic as shown in FIG. 2 (*b*); a slit 11*b* which is a communicating part is provided in a minor axis direction Y; the outer peripheral part 11*c* is compressed in a major axis direction X; and the compressing force works in a direction in which the slit 11*b* is closed.

The communicating part 11*b* described above is formed by a linear slit, and it shall not specifically be restricted as long as it assumes a structure in which the fuel storing vessel 10 can be communicated by inserting a liquid fuel supplying member to supply the liquid fuel F in the fuel storing vessel 10 to the outside. It may be a cross-shaped or radial slit, a structure in which plural slits are formed so that the respective slits are crossed at the same spot, a circular hole or a rectangular hole. It is preferably the linear slit described above. The shape of the outer peripheral part 11*c* shall not specifically be restricted, and it can be formed in a circular shape as well as an elliptical shape as is the case with the embodiment described above.

A convex tapered face (projection) 11*d* is preferably formed on the inner face side of the valve 11*a* toward the inside of the fuel storing vessel 10 so that the liquid fuel supplying member can smoothly be inserted when inserting it.

The fuel discharge part 11 described above is equipped with an adaptor 11*e* shown in FIGS. 2 (*d*) and (*e*), and the adaptor 11*e* is formed in a cylindrical shape and comprises a main body part 11*g* in which a stopper part 11*f* is formed on the inner peripheral face thereof and a fixing member 11*h* which is formed in a cylindrical shape. The valve 11*a* having the construction described above is interposed between the stopper part 11*f* and the fixing member 11*h*.

The combination of the valve 11*a* and the adaptor 11*e* includes a case of an elliptical slit valve and a circular adaptor as shown in FIG. 2, or in opposition, it may be a circular slit valve and an elliptical adaptor. In this case, a slit direction of the slit valve has to be consistent with a major axis of the adaptor.

Assumed is a structure in which the valve 11*a* having the above structure prevents foreign matters such as air from coming in during suspending use (no use) thereof. This is to prevent troubles such as leaking and spouting of the fuel caused by increase of pressure in the liquid fuel storing vessel 10 which is brought about by coming in of air.

The valve 11*a* and the adaptor 11*e* are preferably, from the viewpoint of preventing more effectively leaking of the liquid fuel, those which have the structures described above and comprise materials having low gas permeating property toward the liquid fuel F and which are constituted from materials having a compression set of 20% or less prescribed in JIS K 6262-1997.

The materials for the above valve 11*a* and adaptor 11*e* shall not specifically be restricted as long as they have storage stability, durability against the liquid fuel F stored and a gas non-permeating property and elasticity by which they can be fixed tightly to the fuel supplying tube and have the characteristics described above. They include synthetic resins such as polyvinyl alcohol, ethylene vinyl alcohol copolymer resins, polyacrylonitrile, nylon, cellophane, polyethylene terephthalate, polycarbonate, polystyrene, polyvinylidene chloride and polyvinyl chloride, rubbers such as natural rubber, isoprene rubber, butadiene rubber, acrylonitrile-butadiene rubber, 1,2-polybutadiene rubber, styrene-butadiene rubber, chloroprene rubber, nitrile rubber, butyl rubber, ethylene-propylene rubber, chlorosulfonated polyethylene rubber, acryl rubber, epichlorohydrin rubber, polysulfide rubber, silicone rubber, fluorocarbon rubber and urethane rubber and thermoplastic elastomers. They can be produced by conventional injection molding and vulcanizing molding.

The liquid fuel F used includes a methanol solution comprising methanol and water, but the liquid fuel shall not specifically be restricted as long as hydrogen ions ($H^+$) and electrons ($e^-$) are efficiently obtained from a compound supplied as fuel at a fuel electrode body described later. Liquid fuels such as dimethyl ether (DME), an ethanol solution, formic acid, hydrazine, an ammonia solution, ethylene glycol, a saccharide aqueous solution and sodium boron hydride can be used as well, though depending on the structure of the fuel electrode body.

The above liquid fuels having various concentrations can be used according to the structure and the characteristics of the fuel cell, and the liquid fuels having a concentration of, for example, 1 to 100% can be used.

The follower 12 is brought into contact with the rear end of the liquid fuel F stored in the fuel storing vessel 10 to seal the liquid fuel F, and it moves as the fuel is consumed. It prevents the liquid fuel in the fuel storing vessel 10 from leaking and vaporizing, and it prevents air from coming into the liquid fuel.

This follower 12 is required not to be dissolved or diffused in the liquid fuel F. If it is dissolved or diffused in the liquid fuel F, it is considered that the liquid fuel in the fuel storing vessel 10 which is a fuel storing tank leaks and vaporizes and that not only it can not play a role as a fuel storing tank, but also the liquid fuel F allows the substance constituting the follower 12 to come into the fuel electrode of the fuel cell main body to exert an adverse effect on the reaction in a certain case. The preferred characteristics of the follower 12 used in the present invention are selected taking these conditions into consideration.

The follower 12 which can be used shall not specifically be restricted as long as it has the characteristics described above, and capable of being given are, for example, petroleums such as mineral oil, polyglycol, polyester, polybutene, silicone oils, and those in which a viscosity is increased by mixing solvents with aliphatic metallic soaps, modified clay, silica gel, carbon black, natural or synthetic rubbers, or various synthetic polymers.

The preferred follower 12 has a lower surface free energy than that of the liquid fuel F, whereby like the cases of the fuel storing vessel 10 and the valve in the fuel discharge part 11 each described above, possibility that the liquid fuel can be prevented from coming into a gap between the fuel storing vessel 10 and the follower 12 and leaking to the outside can be enhanced. In light of the above conditions, the material and the surface state of the follower 12 can suitably be selected.

In the present embodiment, assumed is a structure in which the inside of the fuel storing vessel 10 is, as shown in FIGS. 1 (*a*) and (*b*), comprises the fuel storing chamber 13 which is at least hermetically sealed with the follower 12 and in which the liquid fuel F is stored and the pressurizing chamber 14 filled with a means for pressing the follower 12 staying in a state in which it is completely separated from the ambient air and hermetically sealed.

The pressurizing chamber 14 is provided at the rear end side off the fuel storing vessel 10, and it is formed by an upper face of the follower 12 and a sealing member 15 provided with a seal valve. A space between both is the pressurizing chamber.

The pressurizing chamber 14 is filled with a means for pressing the follower. This pressing means assumes a constitution in which filled therein is a volatile liquid G comprising a composition having a higher vapor pressure than that of the liquid fuel F stored in the fuel stored chamber 13.

A case in which the liquid fuel F is a methanol aqueous solution shall be explained below as an example thereof, but the liquid fuel used in the present invention shall not be restricted to it.

When the fuel storing vessel 10 is heated, the volatile liquid G filled in the pressurizing chamber 14, for example, a solvent is vaporized and the vapor can pressurize the liquid fuel F via the follower 12. When only air is filled in the pressurizing chamber 14, the air is expanded as the temperature is elevated, and the liquid fuel F is pressurized via the follower 12. However, the pressurizing effect is low with only air.

That is, when an initial pressure of the pressurizing chamber is 101 kPa, a pressure thereof is only 122 kPa (1.2 time) after the temperature is elevated from 20° C. to 80° C. In this regard, a vapor pressure of methanol which is the liquid fuel changes from 12 kPa to 181 kPa (10 times or more).

In this case, the pressurizing chamber 14 has to be pressurized to a higher pressure than a vapor pressure of the liquid fuel in order to prevent the liquid fuel from boiling, and therefore a liquid comprising a composition having a higher vapor pressure than that of the liquid fuel has to be filled.

In this connection, the "vapor pressure" referred to in the present invention indicates a physical vapor pressure itself which is compared at the same temperature. The "volatile liquid" prescribed in the present invention means a solvent which is a liquid substance at least at room temperature and atmospheric pressure and which has a vapor pressure of 101 kPa or lower at 20° C.

In general, in respect to the "liquid comprising a composition having a high vapor pressure", for example, when a 50 wt % methanol aqueous solution is used, methanol having a higher concentration than the above is referred to as the liquid having a higher vapor pressure.

A vapor pressure of 100% methanol shall be shown in the following Table 1. Further, a vapor pressure of a mixed solvent (methanol aqueous solution) of methanol and water shall be shown in the following Table 2.

TABLE 1

Vapor pressure of methanol

| Temperature (° C.) | Vapor pressure (kPa) |
|---|---|
| 0 | 4.0 |
| 20 | 13.0 |
| 40 | 35.4 |
| 60 | 84.5 |
| 80 | 180.8 |
| 100 | 350.0 |

TABLE 2

Vapor pressures of methanol aqueous solutions of respective concentrations

| Concentration of methanol aqueous solution (wt %) | Vapor pressure at 20° C. (kPa) | Vapor pressure at 60° C. (kPa) | Vapor pressure at 100° C. (kPa) |
|---|---|---|---|
| 0 | 2.3 | 19.9 | 101.3 |
| 10 | 3.7 | 27.5 | 137.3 |
| 20 | 4.7 | 34.4 | 167.9 |
| 30 | 5.5 | 40.9 | 193.3 |
| 40 | 6.2 | 46.7 | 213.3 |
| 50 | 6.9 | 52.0 | 231.9 |
| 60 | 7.9 | 56.9 | 250.6 |
| 70 | 8.9 | 61.6 | 269.2 |
| 80 | 10.1 | 67.0 | 291.9 |
| 90 | 11.6 | 74.2 | 317.2 |
| 100 | 13.0 | 84.5 | 350.0 |

In the present invention, in respect to the "liquid comprising a composition having a high vapor pressure", for example, when a 50 wt % methanol aqueous solution is used, a methanol solution having a higher concentration than the above, as shown in Table 2, is referred to as a liquid having a higher vapor pressure. In the mixed solvent (methanol aqueous solution) of methanol and water, it can be found that the higher the methanol concentration is, the higher the vapor pressure at the respective temperatures is.

Further, a vapor pressure of the volatile liquid G has to be higher than (or close to) a vapor pressure of the liquid fuel F, and therefore it has to be a liquid having a higher vapor pressure or a liquid comprising a composition having a higher vapor pressure than a vapor pressure shown at a certain methanol concentration.

The volatile liquid G used is a liquid comprising a composition having a vapor pressure of preferably 4 to 100 kPa, more preferably 10 to 50 kPa at 20° C.

A liquid having a vapor pressure of less than 4 kPa at 20° C. does not provide a pressure sufficient for pressurizing the fuel. On the other hand, a liquid having a vapor pressure exceeding 100 kPa at 20° C. is a gas at room temperature, and therefore handling such as filling is difficult.

The examples of the volatile liquid comprising a composition having a vapor pressure of 4 to 100 kPa at 20° C. which can be used in the present invention shall be shown in the following Table 3, but the present invention shall not be restricted to them.

TABLE 3

| Solvent name | Vapor pressure at 20° C. (kPa) |
|---|---|
| Heptane | 4.7 |
| 1,2-Dichloroethane | 8.3 |
| Methyl ethyl ketone | 9.3 |
| Acetonitrile | 9.3 |
| Ethyl acetate | 9.8 |
| Cyclohexane | 10.3 |
| Benzene | 10.8 |
| Hexane | 16.1 |
| Chloroform | 20.8 |
| 1,1-Dichloroethane | 24.5 |
| Acetone | 24.6 |
| Cyclopentane | 34.7 |
| Ether | 54.3 |
| Pentane | 56.5 |

The volatile liquid G is filled in the pressurizing chamber 14 preferably in an amount which can keep a saturated vapor pressure in at least a volume obtained by totaling a volume of the pressurizing chamber 14 and a volume of the fuel storing chamber 13.

This makes it possible to prevent the liquid fuel from boiling even in a state in which a remaining amount of the liquid fuel F is small. A filled amount of the volatile liquid G required is calculated from the following equation:

$$(A+B) \times C/(22.4 \times 1000) = X \text{ mol}$$

wherein A is a volume (ml) of the pressurizing chamber 14; B is a volume (ml) of the liquid fuel; and C is a vapor pressure (kPa) of the liquid fuel at a certain temperature.

In this case, an amount of the volatile liquid required is $X \times D$ g, $X \times D/E$ ml, wherein D is a molecular weight of the volatile liquid, and E is a specific gravity thereof.

An amount of the volatile liquid required is a relatively small amount. For example, assuming that the pressurizing chamber has a volume of 20 ml and the fuel storing chamber (tank) having a liquid fuel volume of 100 ml is filled with a methanol aqueous solution of 60 wt % and that 100 wt % methanol is used in order to provide heat resistance at 100° C., an amount of 100 wt % methanol to be filled in the pressurizing chamber 14 may be 0.19 g (0.24 ml, 0.15% based on the liquid fuel, several droplets).

To describe the calculation in further details, a methanol aqueous solution of 60 wt % has a vapor pressure of 250 kPa at 100° C. If it can be pressurized at a higher pressure than the above, the liquid fuel F filled can be prevented from boiling. The total of a volume of the pressurizing chamber 14 and a volume of the liquid fuel is 120 ml. Considering a case where the liquid fuel remains a little, an amount of methanol which can pressurize this space to 250 kPa is required. It is already pressurized to 100 kPa by air (strictly speaking, air is pressurized as well from 100 kPa to 127 kPa by heating), and therefore a remaining partial pressure of 150 kPa should be pressurized by methanol. A vapor pressure of 100 wt % methanol at 100° C. is naturally higher than 150 kPa, and therefore no problems are involved as far as the pressure is concerned. The problem is whether the amount can be satisfied. When a vapor having a pressure of 150 kPa is present in a space of 120 ml, a mol number thereof is calculated to 0.00588 mol (0.188 g=0.24 ml) from a state equation of gas, PV=nRT.

As can be seen from the above, the volatile liquid G is filled in the pressurizing chamber 14 preferably in an amount which can keep a saturated vapor pressure in at least a volume obtained by totaling a volume of the pressurizing chamber 14 and a volume of the fuel storing chamber 13. The above constitution makes it possible to change the amount of the volatile liquid according to the volume, the kind of the liquid fuel and the kind of the volatile liquid.

The present invention shall not be restricted to the example of methanol described above, and the volatile liquids shown in Table 3 described above can be used as well. The case where the methanol aqueous solution is used as the liquid fuel F has been explained above as an example, but with respect to the liquid fuels of the present invention such as dimethyl ether (DME), an ethanol solution, formic acid, hydrazine, an ammonia solution, ethylene glycol, a saccharide aqueous solution and sodium boron hydride, referring to the vapor pressures known at the respective temperatures, the volatile liquids G preferred for the respective liquid fuels can be used in the same manner as described above.

If the pressurizing chamber 14 is, as described above, hermetically sealed with the sealing member 15 equipped with a seal valve described above, the volatile liquid G is vaporized as the liquid fuel F is consumed, whereby the liquid fuel F can be discharged. It is inconvenient if the temperature is lowered by volatilization of the volatile liquid G or the pressure is not constant, and therefore an openable and closable seal valve is provided in the sealing member 15 so that pressure can be applied from the outside in using the fuel or the air can be introduced therefrom.

The above seal valve comprises preferably a valve in which vapor does not leak even at a vapor pressure of the volatile liquid at 100° C.

Considering the case given as the example described above, the vapor pressure of methanol reaches about 350 kPa at 100° C., and therefore a pressure-tight performance of about 500 kPa in combination with that of air should be satisfied. It is not a so high target, and therefore any valve structure is considered to be satisfactory. The structure thereof shall not specifically be restricted as long as it is a valve structure satisfying the above condition, and, for example, a valve having a slit structure, which is the same as the structure of a valve installed in the fuel discharge part 11 shown in FIG. 2 can be used. That is, the fuel discharge part 11 comprising the valve 11a having the structure shown in FIG. 2 described above can be used as the sealing member 15 equipped with a seal valve described above. Further, a valve (a valve in which a direction is turned upside (upper side)) shown in FIG. 6 described later can be used as well.

Figure 3:
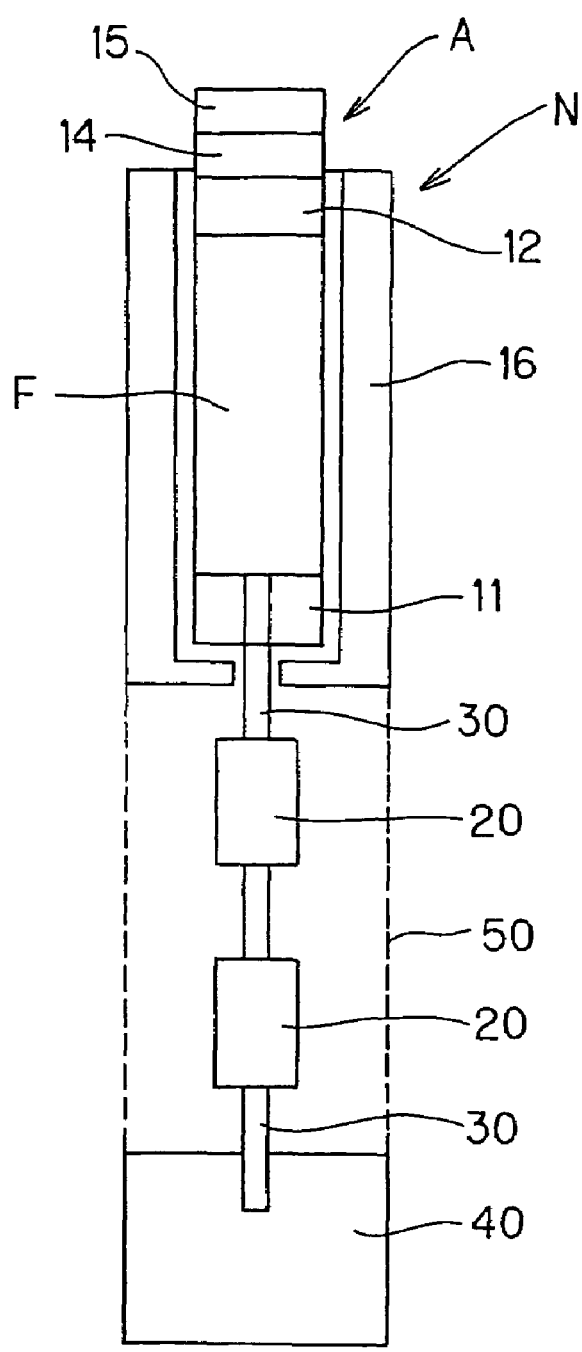
FIG. 3 is an outline cross-sectional drawing showing one example of a state in which the fuel reservoir for a fuel cell shown in FIG. 1 is connected with the fuel cell main body and used as a fuel cell.
Figure 4A:
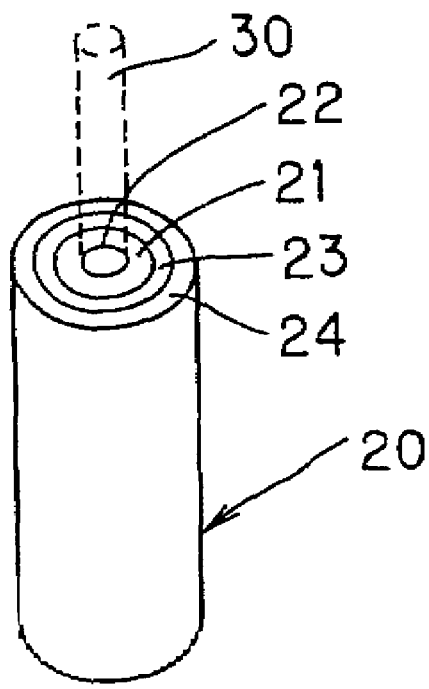
FIGS. 4 (a) and (b) are a perspective drawing and a vertical cross-sectional drawing which explain a unit cell 20.
Figure 4B:
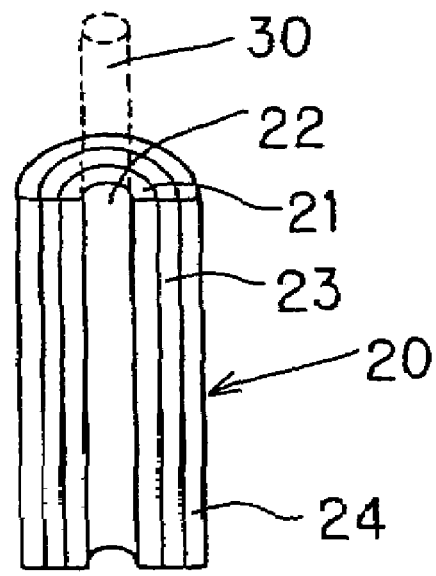

The fuel reservoir for a fuel cell A thus constituted is, as shown in FIG. 3 and FIG. 4, detachably connected with the fuel cell main body N and used.

That is, the fuel cell main body N is equipped, as shown in FIG. 3 and FIG. 4, with unit cells 20 each of which is formed by constructing an electrolyte layer 23 on the outer surface of a fuel electrode body 21 comprising a porous carbonaceous body and constructing an air electrode layer 24 on the outer surface of the electrolyte layer 23, a fuel supplying member 30 connected with a fuel reservoir A and having a penetrating structure and a used-fuel storing tank 40 provided at an end of the fuel supplying member 30. The respective unit cells 20, 20 described above are joined in series and the fuel is supplied in order by means of the fuel supplying member 30. The fuel reservoir A described above is an exchangeable cartridge structure and is inserted into a supporting member 16 for the fuel cell main body N.

Figure 2A:
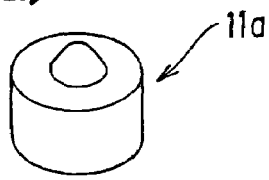
FIG. 2 (a) to (h) show a valve structure of a fuel discharge valve installed in a fuel discharge part of the first embodiment according to the present invention, wherein (a) is a perspective drawing of the valve; (b) is a plain view of the valve; (c) is a vertical cross-sectional drawing of the valve; (d) is a plain view of an adaptor; (e) is a vertical cross-sectional drawing of the adaptor; (f) is a plain view of a state in which the valve is installed in the adaptor; (g) is a vertical cross-sectional drawing of a state in which the valve is installed in the adaptor; and (h) is a partial vertical cross-sectional drawing showing the valve structure of a fuel discharge valve provided in the fuel discharge part.
Figure 2B:
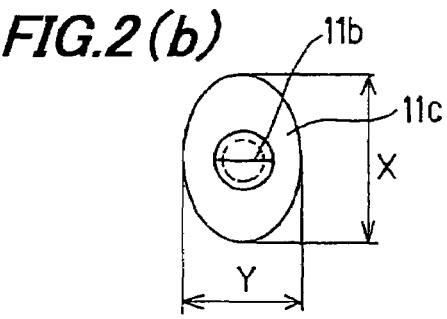
Figure 2C:
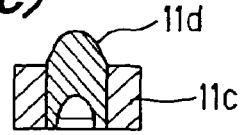
Figure 2D:
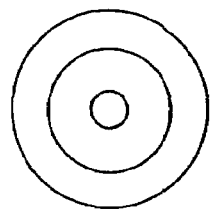
Figure 2E:
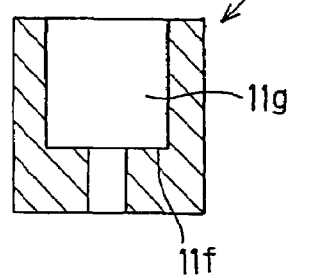
Figure 2F:
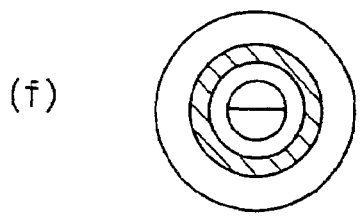
Figure 2G:
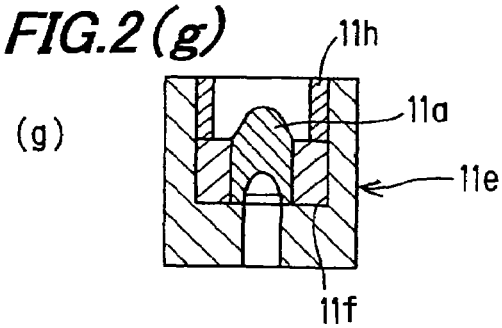
Figure 2H:
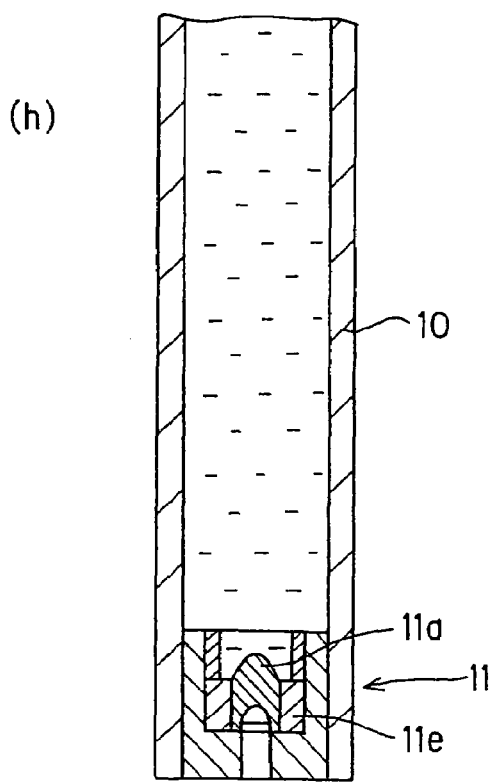

In the above embodiment, the liquid fuel F is directly stored as shown in FIG. 1, FIG. 2(a) and FIG. 3, and the fuel is supplied by means of the fuel supplying member 30 inserted into the valve 11a which is installed in the fuel discharge part 11 at a lower part of the fuel storing vessel 10 for storing the liquid fuel F.

The fuel storing vessel 10, the valve 11a which is installed in the fuel discharge part 11 and the fuel supplying member 30 in the fuel reservoir A are connected respectively with interfitting. In this case, if the respective members have a higher surface free energy than that of the liquid fuel F, the liquid fuel is liable to get into gaps between the junctions, and the possibility that the liquid fuel F leaks is enhanced. Accordingly, a surface free energy of the above members is preferably controlled to a lower level than that of the liquid fuel F at least on a surface brought into contact with the liquid fuel F. In respect to a method for controlling it, a surface of the fuel storing vessel 10 brought into contact with the liquid fuel can be subjected to water repellent film-forming treatment by coating a water repellent agent of a silicone base or a fluorine base.

The respective unit cells 20 have, as shown in FIGS. 4 (a) and (b), the fuel electrode body 21 comprising a fine porous carbonaceous pillar body and in addition thereto, have a through part 22 in a central part thereof through which the fuel supplying member 30 passes, and they assume a structure in which the electrolyte layer 23 is constructed on the outer surface of the fuel electrode body 21 and in which the air electrode layer 24 is constructed on the outer surface of the electrolyte layer 23. The respective unit cells 20 generate an electromotive force of about 1.2 V per cell in theory.

The fine porous carbonaceous pillar body constituting the fuel electrode body 21 may be any ones as long as they are porous structures having fine communication holes, and it includes, for example, carbon composite molded articles which comprise a three-dimensional network structure or a point sintered structure and which are constituted from amorphous carbon and carbon powder, isotropic high density carbon molded articles, carbon fiber paper-making molded articles and activated carbon molded articles. The carbon composite molded articles which comprise amorphous carbon and carbon powder and which have fine communication holes are preferred from the viewpoint of easiness in controlling reaction in the fuel electrode of the fuel cell and further rise in the reaction efficiency.

The carbon powder used for producing the above carbon composite bodies comprising a porous structure is preferably at least one (alone or combination of two ore more kinds thereof) selected from highly oriented pyrolytic graphite (HOPG), kish graphite, natural graphite, artificial graphite, carbon nanotube and fullerene.

A platinum-ruthenium (Pt—Ru) catalyst, an iridium-ruthenium (Ir—Ru) catalyst and a platinum-tin (Pt—Sn) catalyst are formed on the outer surface of the fuel electrode body 21 by a method in which a solution containing the above metal ions or a metal fine particle precursor such as metal complexes is subjected to impregnating or dipping treatment and then subjected to reducing treatment and a method of electrodisposition of metal fine particles.

The electrolyte layer 23 includes ion exchange membranes having proton conductivity or hydroxide ion conductivity, for example, fluorine base ion exchange membranes including Nafion (manufactured by Du Pont Co., Ltd.), and in addition thereto, it includes membranes in which heat resistance and inhibition in methanol crossover are good, for example, composite membranes comprising an inorganic compound as a proton conducting material and a polymer as a membrane material, to be specific, composite membranes using zeolite as the inorganic compound and a styrene-butadiene base rubber as the polymer, and hydrocarbon base graft membranes.

The air electrode layer 24 includes porous carbonaceous bodies on which platinum (Pt), palladium (Pd) and rhodium (Rh) are carried by a method using a solution containing the metal fine particle precursor described above and which comprise a porous structure.

The fuel supplying member 30 shall not specifically be restricted as long as it has a penetrating structure in which it can be inserted into the valve 12 of the fuel reservoir A to supply the liquid fuel F to the respective unit cells 20, and it includes, for example, those comprising porous bodies having capillary force which are constituted from felts, sponges, sintered bodies such as resin particle-sintered bodies and resin fiber-sintered bodies and fiber bundles comprising one or combination of two or more kinds of natural fibers, animal fibers, polyacetal base resins, acryl base resins, polyester base resins, polyamide base resins, polyurethane base resins, polyolefin base resins, polyvinyl base resins, polycarbonate base resins, polyether base resins and polyphenylene base resins. A porosity of the above porous bodies and fiber bundles is suitably set according to a supplying amount of the liquid fuel to the respective unit cells 20.

The used-fuel storing tank 40 is disposed at an end of the fuel supplying member 30. In this case, it provides no problems that the used-fuel storing tank 40 is brought into direct contact with the end of the fuel supplying member 30 to occlude the used fuel directly in an occlusion body, and a sliver, a porous body or a fiber bundle may be provided as a feed at a junction part brought into contact with the fuel supplying member 30 to set it as a discharge passage for the used fuel.

The liquid fuel supplied by the fuel supplying member 30 is used for reaction in the unit cell 20, and since a fuel supplying amount is linked with a fuel consuming amount, the liquid fuel which is discharged to the outside of the cell without reacting is scarcely found, so that a treating system is not required at the fuel outlet side as is the case with conventional liquid fuel type fuel cells. However, assumed is a structure in which when the fuel comes to be supplied in excess depending on an operation status, the liquid fuel which is not used for the reaction can be stored in the storing tank 40 to prevent inhibition reaction.

Numeral 50 is a member comprising a mesh structure which joins the fuel reservoir A with the used-fuel storing tank 40 and which allows the liquid fuel to be surely supplied from a fuel storing tank 10 directly to each of the respective unit cells 20, 20 via the fuel supplying member 30.

In the fuel cell using the fuel reservoir A thus constituted, the liquid fuel is supplied from the fuel reservoir A to the fuel supplying member 30 inserted into the valve 11a in the fuel discharge part and introduced into the respective unit cells 20, 20 by virtue of the penetrating structure.

In the present invention, the fuel reservoir A detachably connected with the fuel cell main body is equipped with the fuel storing vessel 10 of a tube type for storing the liquid fuel F, the fuel discharge part 11 and the follower 12 which seals the liquid fuel F and moves as the liquid fuel F is consumed at the end of the liquid fuel F, and the inside of the fuel storing vessel 10 comprises the fuel storing chamber 13 at least hermetically sealed with the follower 12 and the pressurizing chamber 14 filled with a means for pressing the follower 12 staying in a state in which it is completely separated from the ambient air and hermetically sealed. Accordingly, even if the fuel reservoir A is heated to raise a temperature of the liquid fuel F to that of not lower than a boiling point of the liquid fuel F at an atmospheric pressure, the volatile liquid G which is the means for pressing the follower 12 in the pressurizing chamber 14 is heated as well at the opposite side of the follower 12 sealing the liquid fuel F to pressurize the liquid fuel F to its saturated vapor pressure or higher, and therefore the liquid fuel F can be prevented from boiling. To describe in further details, in the fuel reservoir A for a fuel cell having a structure in which the liquid fuel F is sealed with the follower 12 according to the present invention, the volatile liquid G which has a higher vapor pressure than that of the liquid fuel F and which is the means for pressing the follower 12 is sealed in the pressurizing chamber 14 by sealing the rear end of the fuel storing vessel (tank) 10, and the liquid fuel F can be pressurized via the follower 12 by a vapor pressure of the volatile liquid G sealed in. This makes it possible to prevent the liquid fuel from leaking and vaporizing from the fuel reservoir A due to vaporization of the liquid fuel F without allowing it to boil even if a temperature of the liquid fuel F reaches a boiling point thereof at an atmospheric pressure. Particularly when methanol or ethanol is used as the liquid fuel, a boiling point of the liquid fuel is low, and therefore it is the most desirable embodiment to assume the above structure of the present invention in which boiling is prevented. In using the liquid fuel, a check valve which is a seal valve at the upper end is opened for air introduction.

In the embodiment described above, capillary force is present at least in the fuel electrode body 21 and/or the fuel supplying member 30 brought into contact with the fuel electrode body 21, and this capillary force makes it possible to supply stably and continuously the fuel directly from the fuel storing chamber 13 to each of the respective unit cells 20, 20 without bringing about back flow and interruption. More preferably, setting capillary force of the used-fuel storing tank 40 to a larger value than capillary force of the fuel electrode body 21 and/or the fuel supplying member 30 brought into contact with the fuel electrode body 21 makes it possible to flow stably and continuously the liquid fuel directly from the fuel storing chamber 13 and the respective unit cells 20, to the used-fuel storing tank respectively without bringing about back flow and interruption.

Further, assumed in the above fuel cell is a structure in which the liquid fuel can smoothly be supplied as it is without vaporizing without using specifically auxiliary appliances such as a pump, a blower, a fuel carburetor and a condenser, and therefore it becomes possible to reduce a size of the fuel cell.

Accordingly, in the fuel cell of the above embodiment, it becomes possible to turn the whole part of the fuel cell into a cartridge, and provided is the small-sized fuel cell which can be used as an electric power source for portable electronic devices such as cellular phones and note type personal computers.

In the embodiment described above, a structure in which two unit cells 20 are used has been shown, and a required electromotive force can be obtained by increasing the number of the unit cells 20 joined (serial or parallel) according to the use purposes of the fuel cell.

Figure 5:
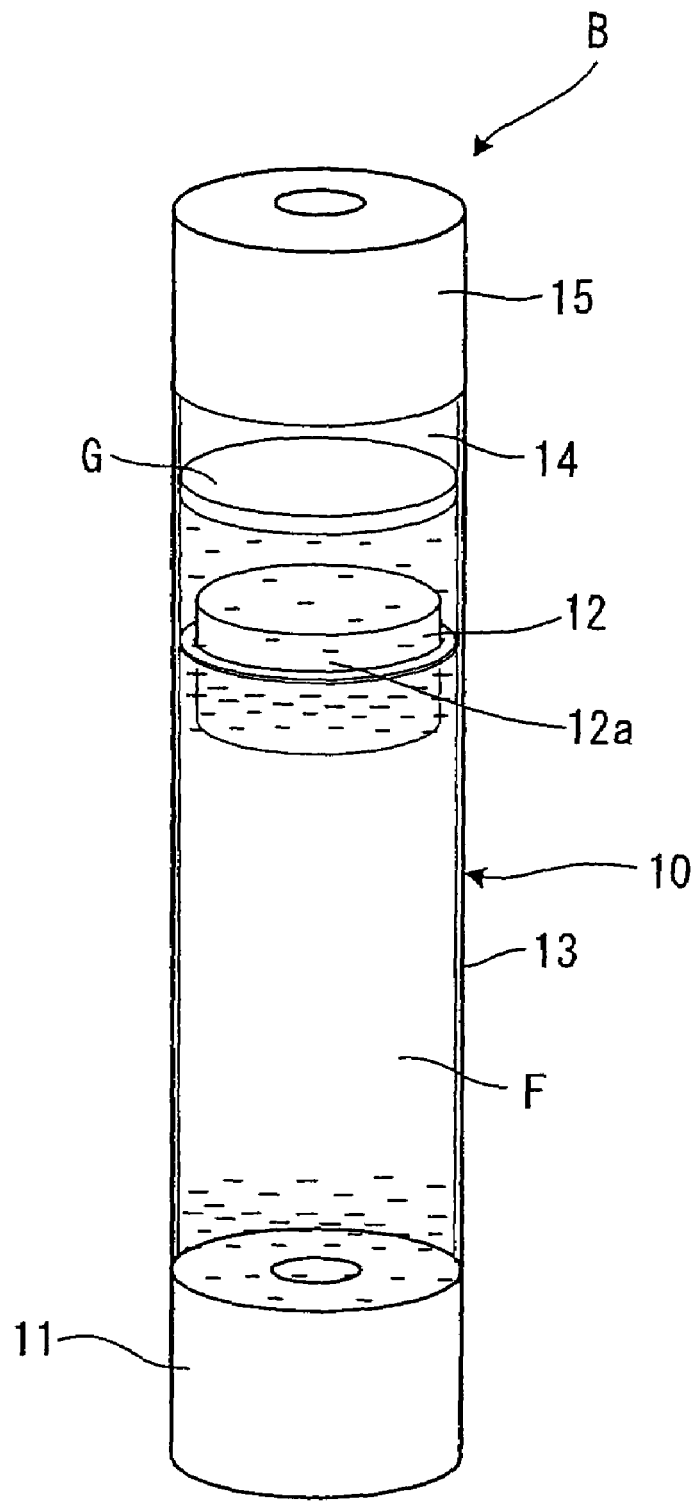
FIG. 5 is an outline perspective drawing showing a fuel reservoir for a fuel cell of the second embodiment according to the present invention.

FIG. 5 shows the fuel reservoir B for a fuel cell of the second embodiment according to the present invention. In the following embodiment, a fuel reservoir having the same structure and exhibiting the same effects as those of the fuel reservoir for a fuel cell of the first embodiment described above shall be given the same reference numerals as in FIG. 1, and the explanations thereof shall be omitted.

In this second embodiment, shown is a suited embodiment in which the follower is allowed to follow well without causing discontinuity of following when the liquid fuel is consumed at a large speed or the fuel storing vessel 10 of a tube type has a large diameter in order to load a large amount of the liquid fuel and in which the liquid fuel F is prevented from leaking and vaporizing from the fuel reservoir A due to vaporization without allowing it to boil even if a temperature of the liquid fuel F reaches a boiling point thereof at an atmospheric pressure.

The fuel reservoir B for a fuel cell of the second embodiment is different from the first embodiment described above only in that a cylindrical follower auxiliary member 12a is inserted into the follower 12 used. It is used in the same manner as in the first embodiment described above.

The follower auxiliary member 12a includes, for example, those constituted from polypropylene, ethylene-vinyl alcohol copolymer resins, polyacrylonitrile, nylon, polyethylene terephthalate, polycarbonate, polystyrene, polyvinylidene chloride, polyvinyl chloride and various rubbers.

The shape of the follower auxiliary member 12a includes, for example, a cylindrical shape, a quadrangular prism shape, a triangular prism shape, a spherical shape and a shape similar to a cross section of the fuel reservoir. A length thereof is preferably 30 to 70% based on the entire length of the follower 17.

In the fuel reservoir B detachably connected with the fuel cell main body in the second embodiment, the follower 12 into which the follower auxiliary member 12a is inserted moves as the fuel is consumed by electric power generation in the fuel cell without causing discontinuity of following, as is the case with the first embodiment described above, even when the fuel is consumed at a large speed or the fuel storing vessel of a tube type has a large diameter, whereby reduction in a volume of the liquid fuel is compensated. In addition thereto, even when the fuel reservoir (liquid fuel) is heated by operation of the fuel cell, the volatile liquid G which is the means for pressing the follower 12 in the pressurizing chamber 14 is heated as well at the opposite side of the follower 12 sealing the liquid fuel F to pressurize the liquid fuel F at its saturated vapor pressure or higher, and therefore the liquid fuel F can be prevented from boiling.

Figure 6A:
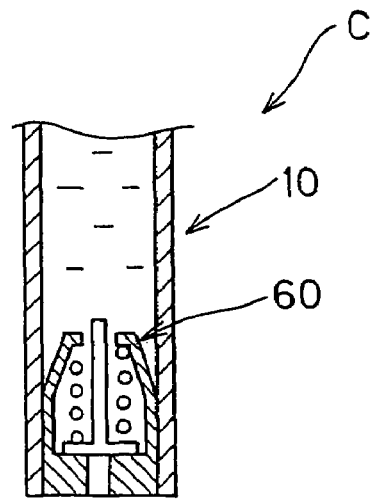
FIG. 6 (a) to (c) show the fuel reservoir for a fuel cell of the third embodiment according to the present invention, wherein (a) is an outline cross-sectional drawing shown in a vertical cross-sectional aspect; (b) is a vertical cross-sectional drawing of the valve; and (c) is a perspective drawing thereof.
Figure 6B:
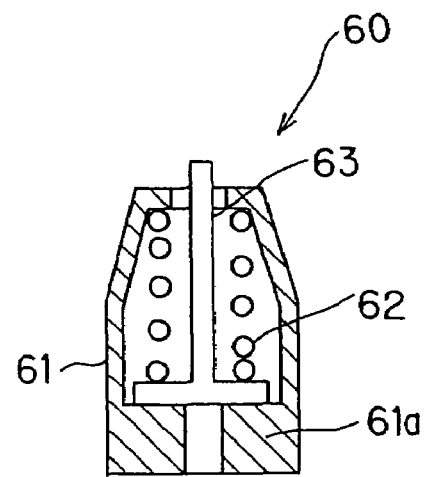
Figure 6C:
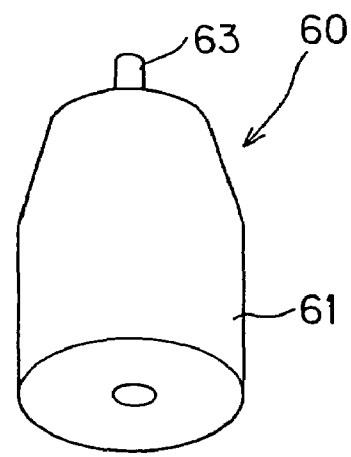

FIG. 6 shows another embodiment (third embodiment) of the fuel reservoir for a fuel cell according to the present invention. The fuel reservoir for a fuel cell C of the third embodiment is different, as shown in FIG. 6 (a) to (c), from the first embodiment described above only in that the fuel discharge part 11 of the first embodiment is changed to a valve 60 having a structure in which it is closed by a resilient body such as a spring member and opened by inserting a liquid fuel supplying member.

The above valve 60 has a valve receiving part 61a in a main body 61, and assumed is a structure in which a valve member 63 having a reverse T-shape in a cross-section is always pressed to the valve receiving part 61 by a resilient body 62 such as a spring member to close the valve and in which it is opened by inserting a liquid fuel supplying member 30 to supply a liquid fuel. A sealing member 15 at the upper end has a valve comprising the slit valve shown in FIG. 2.

In the fuel cell using the fuel reservoir C thus constituted, the liquid fuel is supplied, as is the case with the first embodiment described above, from the fuel reservoir C to the fuel supplying member 30 inserted into the valve 60 which is in a fuel discharge part 11, and it is introduced into unit cells 20, 20 by virtue of a penetrating structure.

Also in the fuel reservoir C of the above embodiment, boiling, bubbling and spouting of the liquid fuel can be prevented even when the fuel reservoir is heated to be in a high temperature state; the liquid fuel is stably supplied directly to the fuel cell main body; a loss in the liquid fuel is not caused even in storing at high temperature; and the fuel cell can be reduced in a size.

Figure 7:
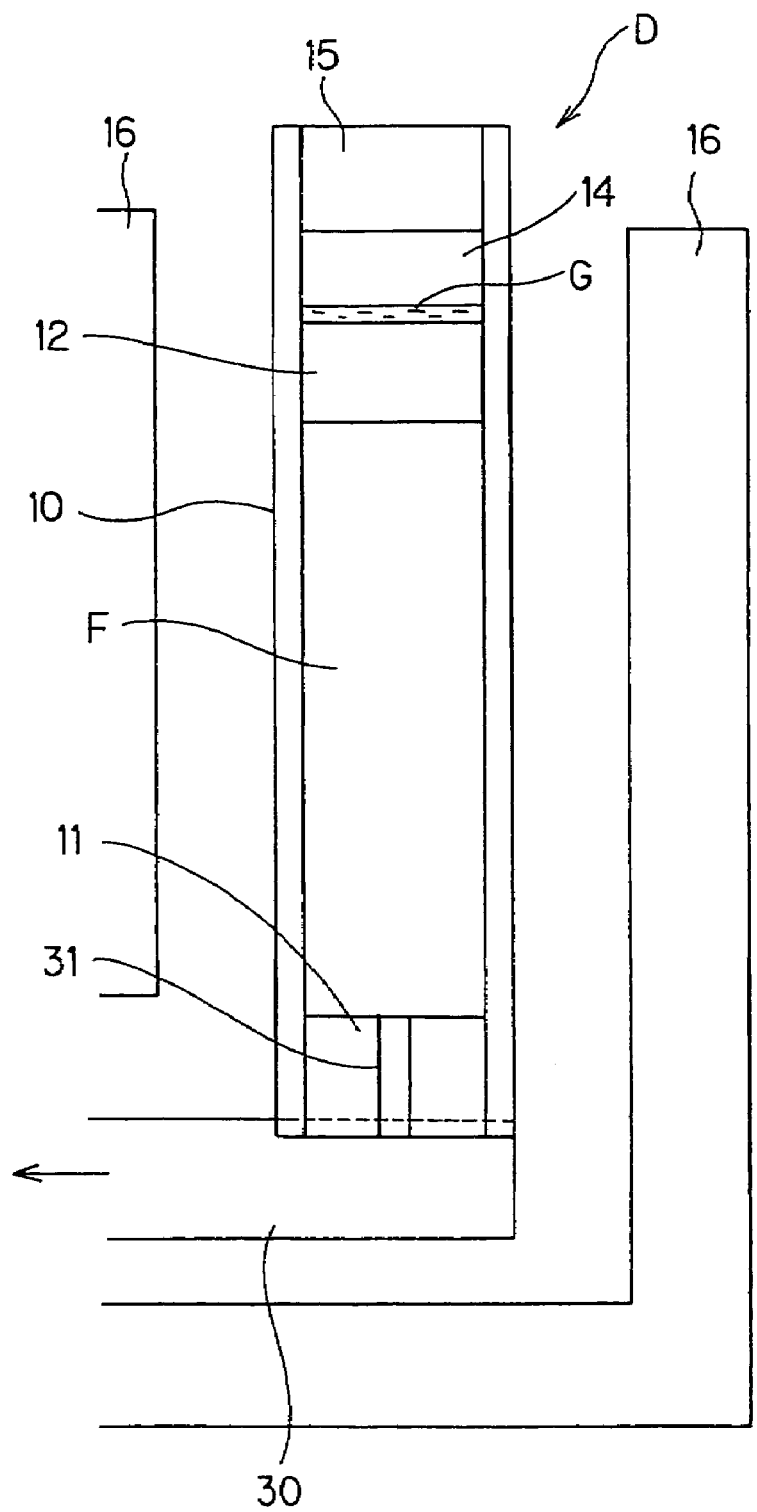
FIG. 7 is a partial outline cross-sectional drawing showing a use aspect of the fuel reservoir for a fuel cell of the third embodiment according to the present invention.
Figure 8:
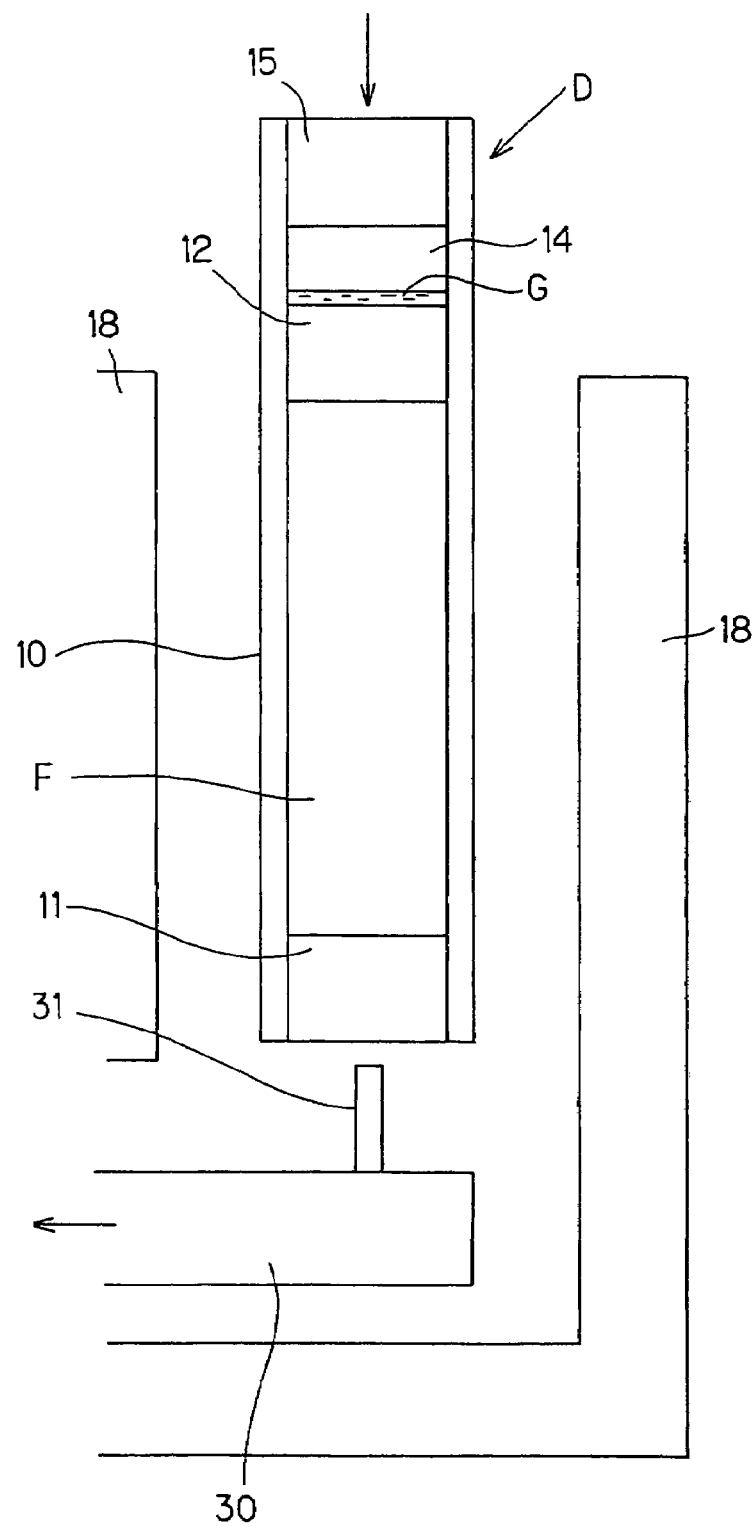
FIG. 8 is an outline cross-sectional drawing showing an aspect of the fuel reservoir for a fuel cell shown in FIG. 7 before use.

FIG. 7 and FIG. 8 show another embodiment of connection with a fuel cell main body. In the following embodiment, a fuel reservoir having the same structure and exhibiting the same effects as those of the fuel reservoir for a fuel cell of the first embodiment described above shall be given the same reference numerals as in FIG. 1, and the explanations thereof shall be omitted.

This embodiment is different from the first embodiment in that the fuel reservoir is, as shown in FIG. 7 and FIG. 8, connected with a liquid fuel supplying member 30 via a liquid fuel supplying tube 31 inserted into a valve 11a.

Assumed is, though not illustrated, a structure in which a tip (arrow directions in FIG. 7 and FIG. 8) of the liquid fuel supplying member 30 is joined in series or in parallel, as is the case with the first embodiment (FIG. 3), with unit cells 20.

Also in the fuel reservoir D of the above embodiment, provided is a fuel reservoir for a fuel cell in which boiling, bubbling and spouting of the liquid fuel can be prevented even when the fuel reservoir is heated to be in a high temperature state, in which the liquid fuel is stably supplied directly to a fuel cell main body, in which a loss in the liquid fuel is not caused even in storing at high temperature and which can reduce a size of the fuel cell.

The fuel reservoir for a fuel cell according to the present invention shall not be restricted to the respective embodiments described above, and it can be modified to various extents in a scope of the technical concept of the present invention.

For example, the cylindrical unit cell 20 is used, but the unit cell may have different forms such as angular prism and tabular forms, and it may be joined in parallel as well as in series with the liquid fuel supplying member 30.

In the embodiment described above, the fuel discharge part having the valve 11a shown in FIG. 2 (a) to (h) has been used as the fuel discharge part, but it shall not specifically be restricted as long as it assumes a structure in which foreign matters such as air are prevented from coming into a liquid fuel F stored directly in a fuel storing vessel 10 from the periphery of a fuel supplying tube 31 due to a change in barometric pressure and temperature and in which the liquid fuel can be supplied to the liquid fuel supplying member 30 by inserting the fuel supplying tube 31.

Further, in the embodiment described above, the present invention has been explained as a direct methanol fuel cell, but the present invention shall not be restricted to the direct methanol fuel cell as long as it is a fuel reservoir for a fuel cell detachably connected to a fuel cell main body, wherein the fuel reservoir is equipped with a fuel storing vessel for storing a liquid fuel, a fuel discharge part and a follower which seals the liquid fuel and moves as the liquid fuel is consumed at the rear end of the liquid fuel. It can suitably be applied as well to a fuel cell of a reforming type. Further, when a fuel storing vessel of a tube type is increased in a diameter in order to load a large volume (for example, 100 ml or more) of a liquid fuel, an amount of a follower can be increased to meet it or a follower auxiliary member can be inserted as is the case with the second embodiment to allow the follower to follow well without causing interruption.

Further, the fuel cell main body has been constituted by constructing the electrolyte layer on the outer surface of the fuel electrode body comprising a fine porous carbonaceous body and constructing the air electrode layer on the outer surface of the electrolyte layer, but the structure of the fuel cell main body shall not specifically be restricted, and it may be, for example, a fuel cell main body assuming a constitution in which a porous carbonaceous body having electric conductivity is a base material and a unit cell obtained by forming the respective layers of electrode/electrolyte/electrode on the surface of the base material or a junction body obtained by joining two or more of the unit cells is provided and in which the base material is impregnated with a liquid fuel via a fuel supplying member and comprising a structure in which a surface of the electrode formed on the outer surface of the base material is exposed to air.

EXAMPLES

Next, the present invention shall be explained in further details with reference to examples, but the present invention shall not be restricted to the examples described below.

Examples 1 to 2

Two kinds of fuel reservoirs which had constitutions shown below and in which a valve in a fuel discharge part was different were prepared and filled with a liquid fuel (70 wt % methanol solution, specific gravity: 0.87) 2 g and a follower 0.30 g.

Constitution of fuel storing vessel: tube 1, common to Examples 1 to 2
  tube 1: length 100 mm, outer diameter 8 mm, inner diameter 6 mm, polypropylene-made extruded tube Constitution of Fuel Discharge Part
  Example 1 (slit valve, based on FIG. 2)
    length 5 mm, outer diameter 6 mm, inner diameter 1 mm, butyl rubber-made, slit length 1.5 mm
  Example 2 (valve, based on FIG. 5)
    length 10 mm, outer diameter 6 mm, inner diameter 1 mm, valve main body 61: made of polypropylene, resilient body 62: stainless steel-made spring, valve 63: made of polypropylene Composition of the Follower, Common to Examples 1 to 2
  A gelatinous follower (specific gravity: 0.90) having the following formulation was used.

| | |
|---|---|
| Mineral oil: Diana Process Oil MC-W90 (manufactured by Idemitsu Kosan Co., Ltd.) | 93 parts by weight |

-continued

| | |
|---|---|
| Hydrophobic silica: Aerosil R-974D (manufactured by Nippon Aerosil Co., Ltd.) | 6 parts by weight |
| Silicone base surfactant: SILWET FZ-2171 (manufactured by Nippon Unicar Co., Ltd.) | 1 part by weight |

Volatile Liquid G Filled, Common to Examples 1 to 2
  100% methanol 0.1 ml

Pressurizing Chamber, Common to Examples 1 to 2
  0.3 ml

Sealing Member, Common to Examples 1 to 2
  based on FIG. 2

The respective fuel reservoirs for a fuel cell having the constitutions described above were left standing in a constant temperature bath at 70° C. and evaluated to find that boiling, bubbling and spouting of the liquid fuel could be prevented even when the fuel reservoir was heated to be in a high temperature state and that the liquid fuel was stably supplied directly to a fuel cell main body and a loss in the liquid fuel was not caused even in storing at high temperature.

INDUSTRIAL APPLICABILITY

The liquid fuel reservoir of the present invention can be used for storing a fuel in a small-sized fuel cell which is suitably used as an electric power source for portable electronic appliances such as cellular phones, note type personal computers and PDA.

The invention claimed is:

1. A fuel reservoir for a fuel cell detachably connected with a fuel cell main body, wherein the fuel reservoir is constituted from a fuel storing vessel for storing a liquid fuel, a fuel discharge part and a follower which is liquid or gelatinous and moves as the liquid fuel is consumed and which seals the liquid fuel at the rear end of the liquid fuel, and the inside of the fuel storing vessel comprises a fuel storing chamber at least hermetically sealed with the follower and a pressurizing chamber filled with a means for pressing the follower staying in a state in which it is completely separated from the ambient air and hermetically sealed, wherein the means for pressing the follower comprises a volatile liquid comprising a composition having a higher vapor pressure than that of the liquid fuel filled in the fuel storing chamber.

2. The fuel reservoir for a fuel cell as described in claim 1, wherein the volatile liquid is filled in the pressurizing chamber in an amount which can keep a saturated vapor pressure in at least a volume obtained by totaling a volume of the pressurizing chamber and a volume of the fuel storing chamber.

3. The fuel reservoir for a fuel cell as described in claim 1, wherein the pressurizing chamber is equipped with at least one seal valve through which air can be introduced.

4. The fuel reservoir for a fuel cell as described in claim 3, wherein the seal valve comprises a valve from which vapor does not leak even at a vapor pressure of the volatile liquid at 100° C.

5. The fuel reservoir for a fuel cell as described in claim 1, wherein the liquid fuel is at least one selected from the group consisting of a methanol solution, an ethanol solution, dimethyl ether (DME), formic acid, hydrazine, an ammonia solution, ethylene glycol, a saccharide aqueous solution and sodium boron hydride.

6. The fuel reservoir for a fuel cell as described in claim 1, wherein the fuel cell main body assumes a structure in which it is connected with plural unit cells each of which is formed by constructing an electrolyte layer on the outer surface of a fuel electrode body and constructing an air electrode layer on the outer surface of the electrolyte layer and in which a fuel supplying member connected with the fuel reservoir is connected with the unit cells to supply the liquid fuel.

* * * * *